(12) United States Patent
Spour

(10) Patent No.: US 12,539,905 B2
(45) Date of Patent: Feb. 3, 2026

(54) STROLLER OR STROLLER FRAME HAVING A MOTOR AND HAVING A CONTROL UNIT FOR SUPPORTING THE DRIVE WITH FORCE SENSOR CALIBRATION, METHOD FOR CONTROLLING THE MOTOR, AND COMPUTER-READABLE STORAGE MEDIUM

(71) Applicant: CYBEX GmbH, Bayreuth (DE)

(72) Inventor: Jiri Spour, Zlatniky-Hodkovice (CZ)

(73) Assignee: CYBEX GmbH, Bayreuth (DE)

( * ) Notice: Subject to any disclaimer, the term of this patent is extended or adjusted under 35 U.S.C. 154(b) by 905 days.

(21) Appl. No.: 17/753,953

(22) PCT Filed: Sep. 17, 2020

(86) PCT No.: PCT/EP2020/075936
§ 371 (c)(1),
(2) Date: Mar. 18, 2022

(87) PCT Pub. No.: WO2021/053054
PCT Pub. Date: Mar. 25, 2021

(65) Prior Publication Data
US 2023/0347961 A1    Nov. 2, 2023

(30) Foreign Application Priority Data

Sep. 18, 2019    (DE) .................... 20 2019 105 162.0

(51) Int. Cl.
*B62B 5/00*    (2006.01)
*B62B 9/00*    (2006.01)

(52) U.S. Cl.
CPC .............. *B62B 5/0073* (2013.01); *B62B 9/00* (2013.01)

(58) Field of Classification Search
CPC ....... B62B 5/0073; B62B 9/00; B62B 5/0404; B62B 5/0069; B62B 7/062; B62B 7/066;
(Continued)

(56) References Cited

U.S. PATENT DOCUMENTS 5,483,820 A    1/1996  Nakamoto et al.
11,513,532 B2 *  11/2022  Park ...................... B62B 5/0073
(Continued)

FOREIGN PATENT DOCUMENTS

CN    102959377 A    3/2013
CN    108536184 A    9/2018
(Continued)

OTHER PUBLICATIONS

"International Application No. PCT/EP2020/075936, International Search Report and Written Opinion mailed Jan. 11, 2021", (Jan. 11, 2021), 12 pgs.
(Continued)

*Primary Examiner* — Kevin Hurley
*Assistant Examiner* — Marlon A Arce
(74) *Attorney, Agent, or Firm* — Schwegman Lundberg & Woessner, P.A.

(57) ABSTRACT

Stroller or stroller frame, comprising at least one motor, in particular an electric motor, for in particular assisted driving of the stroller or stroller frame, at least one pusher for pushing the stroller or stroller frame, at least one force sensor device for detecting a force-related variable, in particular a force or a force component which acts on the pusher, or a variable derived from this force or force component, for example a torque or a change over time of the force or force component, and at least one control unit which is configured to initiate a calibration of the force sensor device depending on a result of at least one detection of the force-related variable, in particular depending on the
(Continued)

Figure 1:
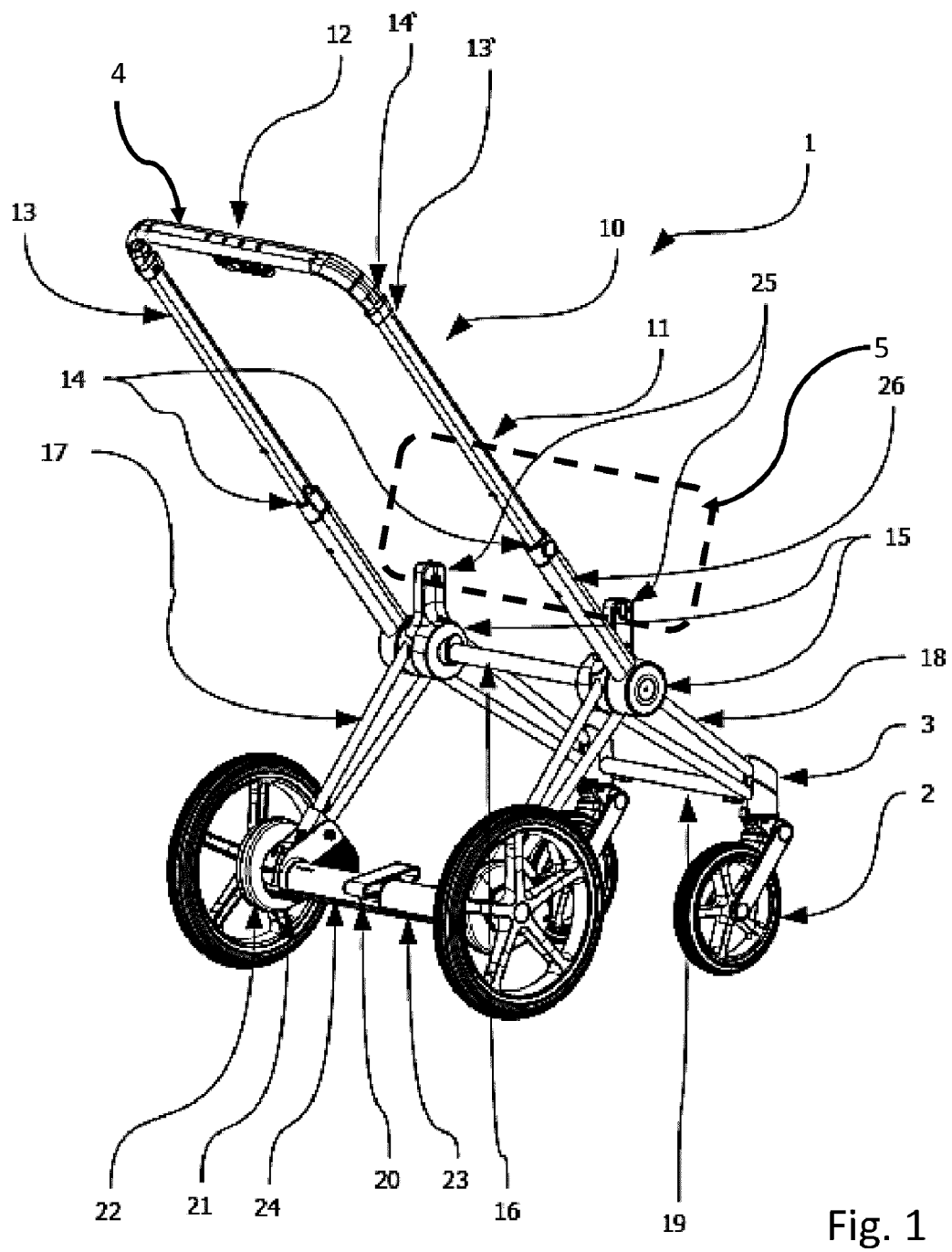

result of a plurality, of preferably at least 3, in particular successive, detections of the force-related variable.

16 Claims, 3 Drawing Sheets

(58) Field of Classification Search
CPC ......... B62B 5/0043; G01L 5/22; G01L 25/00; Y02T 10/72
See application file for complete search history.

(56) References Cited

U.S. PATENT DOCUMENTS

| | | | |
|---|---|---|---|
| 2007/0233403 A1* | 10/2007 | Alwan | A61B 5/1038 702/33 |
| 2014/0196548 A1 | 7/2014 | Watson et al. | |
| 2016/0082772 A1* | 3/2016 | Biderman | B60K 7/00 301/6.5 |
| 2016/0229437 A1* | 8/2016 | Jackman | H02P 7/28 |
| 2017/0088157 A1 | 3/2017 | Young et al. | |
| 2017/0120450 A1 | 5/2017 | Toyoda et al. | |
| 2018/0281838 A1* | 10/2018 | Andersson | B62B 7/04 |
| 2020/0180439 A1* | 6/2020 | Chung | B62B 3/001 |
| 2021/0016816 A1* | 1/2021 | Schillinger | B62B 5/0033 |

FOREIGN PATENT DOCUMENTS

| | | |
|---|---|---|
| CN | 109414811 B | 5/2022 |
| DE | 102010039852 A1 | 3/2012 |
| DE | 102013224885 A1 | 6/2015 |
| DE | 202017104166 U1 | 10/2018 |
| EP | 1701146 A1 | 9/2006 |
| EP | 3444142 A1 | 2/2019 |
| JP | H0843220 A | 2/1996 |
| JP | 2000214016 A | 8/2000 |
| JP | 2005041352 A | 2/2005 |
| JP | 2012021845 | 2/2012 |
| JP | 2013536445 | 9/2013 |
| JP | 2017012546 | 1/2017 |
| KR | 20170128158 | 11/2017 |
| WO | WO-2019012060 A1 | 1/2019 |
| WO | WO-2021053054 A1 | 3/2021 |

OTHER PUBLICATIONS

"Chinese Application 202080074993.0, First Office Action dated Sep. 19, 2023", (Sep. 19, 2023), 16 pgs.

"Japanese Application No. 2022-517375, Office Action dated Jun. 17, 2025", (Jun. 17, 2025), 6 pgs.

"Korean Application No. 10-2022-7012455, Office Action dated Sep. 25, 2025", w English Translation, (Sep. 25, 2025), 14 pgs.

* cited by examiner

STROLLER OR STROLLER FRAME HAVING A MOTOR AND HAVING A CONTROL UNIT FOR SUPPORTING THE DRIVE WITH FORCE SENSOR CALIBRATION, METHOD FOR CONTROLLING THE MOTOR, AND COMPUTER-READABLE STORAGE MEDIUM

PRIORITY CLAIM TO RELATED APPLICATIONS

This application is a U.S. national stage filing under 35 U.S.C. § 371 from International Application No. PCT/EP2020/075936, filed on 17 Sep. 2020, and published as WO2021/053054 on 25 Mar. 2021, which claims the benefit under 35 U.S.C. 119 to German Application No. 20 2019 105 162.0, filed on 18 Sep. 2019, the benefit of priority of each of which is claimed herein, and which applications and publication are hereby incorporated herein by reference in their entirety.

The invention relates to a stroller frame, a stroller and a computer-readable storage medium.

Motorized strollers for children are known in principle. These may be configured to be moved solely by motor power. Furthermore, it is known in principle to provide strollers with motor assistance that supports the driving force of a person operating the stroller, but does not provide assistance when no force is exerted by the operator.

From DE 20 2017 104 166 U1, a stroller frame as well as a corresponding stroller with a force sensor device for measuring the amount or the direction of a force or force component is known. Thereby, it is possible that a control of the motor assistance of the stroller can be performed based on an output of the sensor device. The force sensor device may be provided on the handle of the pusher. Thus, when a user pushes or pulls the stroller, the force sensor device measures the amount or the direction of the applied force. By means of a coupled control device, the output measured via the force sensor device is then used to control at least one drive motor. This is used, depending on the force applied, to assist the user in pushing.

Force sensor devices are known in principle. Such force sensor devices, in particular strain gauges, can be based, for example, on the change in resistance due to changes in length and/or cross-section. Force-sensing devices also include devices that provide an indication of the applied force indirectly, for example by sensing a torque. If a strain gauge (DMS) is stretched, its resistance increases. If it is compressed, its resistance decreases. Due to the high sensitivity of strain gauges, there are disturbance variables that can affect the measurement result. Typical disturbance variables include temperature, creep and humidity. When such force-sensing devices are used in strollers, these disturbance variables can lead to distorted output and thus degraded drive support. This can pose a safety risk to a child located in the stroller. In general, comparatively small deviations can be tolerated in strollers, but larger deviations on the other hand are problematic.

For this reason, it is the object of the invention to propose a stroller or stroller frame with motor assistance, with which an as simple, safe and user-friendly application as possible is enabled. In particular, (disturbing) interruptions for the use of the stroller or stroller frame or its motor assistance shall be reduced or omitted.

This object is solved in particular by the features of claim 1.

In particular, the object is solved by a stroller or a stroller frame, comprising at least one motor, in particular an electric motor, for (in particular assisting) driving the stroller or stroller frame, at least one pusher for pushing the stroller frame or stroller, at least one force sensor device for detecting a force-related variable, in particular a force and/or a force component acting on the pusher, and/or a variable derived from this force or force component, for example a torque and/or a change over time of the force or force component, and at least one control unit which is configured to initiate (and preferably also perform) a calibration of the force-related variable (i.e. a calibration of the force sensor device with respect to the force-related variable). Through such a calibration, in particular comparatively large deviations (due to changing, in particular external, conditions) can be compensated or at least reduced. By that the control and thus the use of the stroller or stroller frame is improved.

Particularly preferably, the control unit is configured to initiate a calibration of the force sensor device (with respect to the force-related variable) depending on a result of at least one detection of the force-related variable, in particular depending on a result of a plurality, of preferably at least 3 (further preferably at least 5, still further preferably at least 8) and/or at most 100 (or at most 50 or at most 30), in particular (preferably directly) successive, detections of the force-related variable. In this way, it can be achieved in a simple manner that the user-friendliness of the stroller or stroller frame is improved. By the fact that the calibration is (only) initiated or started when a result with respect to the detection of the force-related variable is available, for example the likelihood that a calibration is performed when this (in view of the current use of the stroller or stroller frame) would be annoying for the user can be reduced. In particular, a calibration is not (necessarily) performed when (as soon as) the motor assistance is switched on. Such a calibration, which (necessarily) takes place immediately after the start of the motor assistance, has or would have the consequence that a certain time elapses until the user can then use the stroller or stroller frame (with motor assistance) at all.

For example, it is not mandatory that the user first leaves the stroller or stroller frame standing after starting the motor assistance, so that a calibration can be performed before the stroller including motor assistance can then actually be used. In general, it is not mandatory to wait until the force sensor device has been calibrated before use of the stroller or stroller frame can be begun. A corresponding pause (without or with only slight application of force to the force sensor device) is not (necessarily) required. Especially also situations in which a user initially uses the (motorized) stroller or stroller frame without motor assistance, but then (for example due to an incline) wants to be supported by the motor, this user now does not (necessarily) have to wait for a calibration of the force sensor device first after switching on the motor. Overall, a simple, safe, user-friendly and/or time-saving application of a motorized stroller can be achieved.

Preferably, the control unit is configured to (only) initiate a calibration of the force sensor device (with respect to the force-related variable) if (if and/or as soon as) the result (of the detection(s) of the force-related variable) indicates that no pushing by a person is taking place. This can enable a particularly user-friendly or time-saving application.

Insofar as in the present context it is said that an initiation takes place as soon as a certain condition is fulfilled, this means in particular that the calibration is begun or initiated (and preferably also carried out, in particular immediately, thereafter) at the latest after expiry of 1 minute, preferably at most 10 seconds, further preferably at most 1 second, still further preferably at most 0.5 seconds.

Basically it is preferred if the calibration takes place immediately after the occurrence of the respective predetermined condition. However, it is also conceivable that the result of the detection, in particular the result of a plurality of detections, is initially stored and then, possibly, later a calibration (for example zero point determination) is carried out with the aid of this result (for example by forming an average value of a plurality of detections). The mean value is preferably an arithmetic mean or a geometric mean or a harmonic mean or a weighted or trimmed mean or another suitable mean value.

Calibration means in particular at least one reference point determination, preferably zero point determination, during which there is preferably a force-free state (i.e. in particular no pushing of a user takes place). If necessary, the relationship between the force actually applied and the measured force can be determined (e.g. in a simple manner familiar to the person skilled in the art) by measurement.

Preferably, the control unit is configured to initiate a calibration of the force sensor device (with respect to the force-related variable) (only) when (if and/or as soon as) the plurality of detections of the force-related variable is within a predetermined value interval (or a value interval of predetermined width), of preferably a width of at least 0.1 N, further preferably at least 0.3 N, further preferably 0.5 N and/or at most 10 N, preferably at most 5 N, further preferably at most 2 N, for the force-related variable. If in this context the force-related variable is not directly a force or force component, the values given here in newtons are intended to correspond to that force which corresponds to the actually (possibly directly) detected variable, such as the torque. This shall also apply in the following whenever values are given in newtons. If, for example, a detection of a torque (directly) occurs, a force applied to the pusher can be derived therefrom, which in this case results from the fact that the lever travel (in meters) is known or defined for an existing stroller or stroller frame.

Alternatively or additionally, the control device is configured to initiate a calibration of the force sensor device (with respect to the force-related variable) (only) if (if and/or as soon as) a statistical parameter, in particular a statistical spread, preferably a variance, of the plurality of detections lies within a predetermined value for the statistical parameter, of preferably at least 0.1 N, further preferably at least 0.3 N, still further preferably at least 0.5 N and/or at most 10 N, preferably at most 5 N, still further preferably at most 2 N. In this way, user-friendliness can be improved in a simple manner.

A statistical spread is to be understood in particular as a measure of the dispersion of the detected measured values. If the statistical parameter or the statistical spread is outside a predetermined interval or above a predetermined value, calibration is preferably not performed.

For determining a speed of the stroller or a rotational speed of at least one wheel a corresponding speed sensor can be provided. This is preferably configured at least to detect whether the stroller or the at least one wheel is at rest or moving, in particular to detect two, further preferably at least five different values (greater than zero).

According to an embodiment, the control unit is configured to initiate a calibration of the force sensor device (with respect to the force-related variable) (only) if (if and/or as soon as) a predetermined speed of the stroller frame, in particular a predetermined rotational speed of at least one wheel, is assumed or undershot, preferably to initiate (only) if (if and/or as soon as) at least one wheel is at rest. The predetermined speed may be cm/s, preferably cm/s, optionally (at least approximately) 0 cm/s.

According to an embodiment, the control unit is configured to initiate a calibration of the force sensor device (with respect to the force-related variable) (only) if a detected value of the force-related variable is at or below a predetermined value, wherein the predetermined value preferably is at at least 1 N, optionally at least 2 N or at least 5 N and/or at most 10 N). By this the risk of miscalibration is reduced, for example when a static force acts (e.g. a jacket rests on the pusher). In particular, by this the risk of confusing a condition in which a static force is applied (as is usually not the case in pushing, which is a highly dynamic process) with a case in which no force at all is applied to the pusher can be reduced.

Preferably, the control unit is configured to prevent motor assistance (i.e., in particular, not to allow it to start in the first place) or to stop motor assistance (which is already taking place) and/or to initiate an error display (for example, by means of a visual and/or acoustic display, such as a sound, preferably a beep, or an illuminated display, e.g., LED or display indicator), if (if and/or as soon as) a detected value of the force-related variable is at or above a predetermined value, wherein the predetermined value preferably is at least 10 N, further preferably at least 20 N, still further preferably at least 25 N and/or at most 100 N, preferably at most 50 N, further preferably at most 40 N. Particularly preferably, in such a case neither a calibration nor a motor assistance is performed. In this way, it can be achieved that a (gross) malfunction of the force sensor device has as few as possible or no harmful consequences, in particular does not lead to the motor assistance either not taking place according to the user's wishes or even leading to dangerous situations. Particularly preferably, in such a case no motor assistance takes place at all. In particular, this condition is checked by the control unit before further conditions (with regard to the initiation of a calibration) are checked (in a first checking step).

The force sensor device and/or the control unit may be configured to perform a detection of the force-related variable, at least until an initiation of the calibration, in a predetermined frequency of preferably at least 2 Hz, further preferably at least 5 Hz, further preferably at least 8 Hz and/or at most 100 Hz, preferably at most 50 Hz, further preferably at most 30 Hz, further preferably at most 20 Hz. By means of such a detection frequency, a comparatively accurate knowledge of the current use of the stroller or stroller frame can be obtained in an effective manner.

The plurality of detections is preferably at least 5, further preferably at least 8 and/or at most 500, preferably at most 100. Alternatively or additionally, the plurality of versions is at least 0.3 times, preferably at least 0.5 times and/or at most 50 times, preferably at most 10 times, further preferably at most 5 times, further preferably at most 2 times, as large as a (the) frequency of the detection of the force-related variable in Hz. Thus, a comparatively meaningful result can be derived in an effective manner.

The control unit is preferably designed to perform the calibration, preferably to determine a new reference point (in particular zero point) for the force-related variable, in particular depending on the value(s) of the force-related variable taken into account for the initiation, with a mean value of a plurality of values of the force-related variable taken into account for the initiation being determined as the new reference point (zero point) in a particularly preferred manner. Alternatively, another control unit (possibly also an external control unit) can also perform the actual calibration. The mean value is preferably an arithmetic mean or a geometric mean or a harmonic mean or a weighted or trimmed mean or another suitable mean value.

The calibration can be carried out at least partially, possibly completely, with those values which were also used for the initiation of the calibration. Alternatively or additionally, however, other values (possibly to be measured first) can also be used for the calibration.

The stroller or the stroller frame or its control unit, preferably comprises at least one (electronic) memory unit, in particular for storing a (previously performed) calibration. The memory unit may comprise a (micro-)chip.

The control unit is preferably designed to control the motor based on a stored calibration until a new calibration. This applies in particular even if individual or all components of the stroller or stroller frame, for example the force sensor device and/or the control device, are switched off in the meantime.

In particular, a compromise can be (consciously) selected between a detection accuracy (at a certain point in time) and the user-friendliness (at the corresponding point in time). In particular, it is preferably consciously accepted that a detection is less accurate at least over a certain period of time (since an "older" calibration is reverted to), for this the user is not restricted (in terms of time) with regard to the concrete use, in particular does not have to wait for a pause. The calibration is preferably made up for when the user is not actively using the stroller or stroller frame anyway (for example, waiting at a traffic light).

In embodiments, the control unit is designed to check, in particular (immediately) after start-up of the motor (and possibly subsequent initial calibration) at predetermined intervals, of preferably at least 5 min, further preferably at least 10 min and/or at most 12 h, preferably at most 2 h, whether an initiation of the calibration is possible (i.e. whether the other conditions necessary for this are met). If an initiation of the calibration is possible, the control unit preferably also initiates an execution of the calibration (or is configured accordingly). Alternatively, the control unit can be designed not to initiate any further calibration after the calibration has been initiated (in particular until the engine is switched off).

In embodiments, the control unit is designed to check, in particular (immediately) after start-up of the motor (and possibly subsequent initial calibration), whether an initiation of calibration is possible if (if and/or as soon as) a predetermined condition, in particular one predetermined externally, is present, such as, for example, a change in temperature compared to a temperature at the time of a last calibration and/or a (relative) humidity change compared to a (relative) humidity at the time of a last calibration and/or another change in ambient conditions. If an initiation of the calibration is possible, the control unit preferably also initiates an execution of the calibration (or is configured accordingly). In particular, therefore, a renewed calibration can take place if environmental conditions have changed accordingly (strongly), which means an effective use of the resources necessary for this (computing power or electronic memory and/or electrical memory for an operating current).

The above-mentioned object is furthermore preferably solved by a computer-readable storage medium which contains instructions which cause at least one processor to implement a method for controlling a stroller (in particular of the above type), comprising at least one motor, in particular electric motor, for assisted driving the stroller frame and at least one pusher for pushing the stroller frame, when the instructions are executed by a processor, wherein in the method at least one force-related variable, in particular a force and/or a force component (acting on the pusher and/or a variable derived from this force or force component, for example a torque and/or a change over time of the force or force component is detected, wherein a calibration of the force sensor device (with respect to the force-related variable) is initiated depending on a result of at least one detection of the force-related variable, in particular depending on the result of a plurality, of preferably at least 3, in particular (directly) successive, detections of the force-related variable.

Further method steps, which can be implemented accordingly, can be derived from the above and following explanations as well as from the enclosed claims relating to the stroller frame or stroller. Configurations or functionalities specified there can be implemented as specific process steps.

The above-mentioned object is further solved in particular by a method for controlling a stroller, preferably of the above type, comprising at least one motor, in particular electric motor, for assisted driving of the stroller and at least one pusher for pushing the stroller, wherein at least one force-related variable, in particular a force and/or a force component acting on the pusher, and/or a variable derived from this force or force component, for example a torque and/or a change over time of the force or force component, is detected, wherein a calibration of the force sensor device (with respect to the force-related variable) is initiated depending on a result of at least one detection of the force-related variable, in particular depending on the result of a plurality of preferably at least 3, in particular (preferably directly) successive, detections of the force-related variable. Further method steps, which can be carried out accordingly, can be derived from the above and following explanations as well as from the accompanying claims relating to the stroller frame or stroller. Configurations or functionalities indicated there can be realized as specific process steps.

The force sensor device can (at least partially) be arranged directly on and/or in the pusher (for example, a horizontally extending and/or upper pusher section). Alternatively or additionally, the force sensor device may be arranged at a connecting section of the pusher unit with a frame of the stroller frame. In this regard, the force sensor device may be designed to measure a force acting on the frame from the pusher (or a pusher section).

The drive unit may be configured in various ways. For example, the drive unit may comprise an electric motor and a brake, wherein when the drive unit is switched to the non-drive state, the brake unit or the brake is switched by a (the) control unit. In a further embodiment, however, it is also conceivable that, if the drive unit comprises an electric motor, the electric motor is switched as a generator and/or is used as a recuperation brake, wherein the recuperation brake is designed to deliver electrical energy to an accumulator. This has the advantage that, in addition to the motor, no further brake or braking process may be necessary.

In one embodiment, the stroller frame may comprise at least three wheels, wherein the drive unit may be arranged and configured to drive and/or block at least one of the wheels.

The stroller frame may be configured in different ways. Three-wheel configurations, but also four-wheel configurations may be provided.

In one embodiment, the stroller frame may comprise a frame to which the pusher section and/or at least three wheels may be arranged, in particular attached.

In one embodiment, the pusher section may be configured to be connectable to the frame via a connecting member and/or a connecting section, wherein the force sensor device may be arranged at least in sections on the connecting member or the connecting section.

It is possible to detect the interaction of a user with the pusher section indirectly via a force between the pusher section and the frame.

In one embodiment, the frame may include at least one joint section, wherein the pusher section may be configured to rotate about the joint section.

In order to fold the stroller frame to obtain a compact carrying dimension, the pusher section may be configured to be foldable. For this purpose, the pusher section may be rotated around the joint section.

In one embodiment, the force sensor device may be disposed in the joint section.

It is thus conceivable that an interaction of a user with the stroller frame can be detected indirectly via a torque measured in the joint section. This provides another way in which the interaction can be detected. The arrangement of the force sensor device in the joint section has the advantage that a compact construction dimension and a safe arrangement protected from external influences can thereby be selected. In addition, this eliminates the need for complex wiring of the pusher section.

The at least one (force) sensor device can be arranged on and/or in the pusher, in particular a handle of the pusher, and/or be arranged in and/or close to the pusher attachment area. By a pusher attachment area is meant, in particular, an area where the pusher is attached to a main body of the stroller frame. By an arrangement close to the pusher attachment area is meant in particular an arrangement at a distance of less than 10 cm, preferably less than 5 cm, with respect to the pusher (where, in the case of a relatively moving pusher, the minimum distance is meant here in particular).

In one embodiment, the frame may be configured to be foldable from an unfolded configuration to a folded configuration, in particular using the joint section.

In one embodiment, in an/the unfolded configuration of the frame, the force sensor device may be communicatively and/or electrically connected to the drive unit and/or the control unit, and/or in a/the folded configuration of the frame, the force sensor device may not be communicatively and/or electrically connected to the drive unit and/or the control unit.

In one embodiment, the unfolded configuration may be a fully unfolded configuration or a partially unfolded configuration. In one embodiment, the folded configuration may be a fully folded configuration or a partially folded configuration.

The drive mechanism can be easily deactivated by folding the stroller frame or the frame.

The pusher is preferably formed as one-piece (possibly with individual parts that can be moved against each other). In particular, the pusher can have a horizontal handle. Alternatively, the pusher can also be formed in multiple pieces (e.g., in two pieces), for example with several handles separated from one another.

Preferably, the force sensor device is configured to detect a plurality of different values, for example at least 10 different values (>0), preferably at least 100 different values (>0).

Preferably, the stroller or stroller frame comprises a (preferably rechargeable) battery, preferably comprising at least 2 or at least 4 or at least 10 battery cells.

The control unit may comprise at least one (micro) processor and/or at least one (micro)controller and/or at least one (electronic) chip.

Further embodiments will be apparent from the dependent claims.

Figure 2:
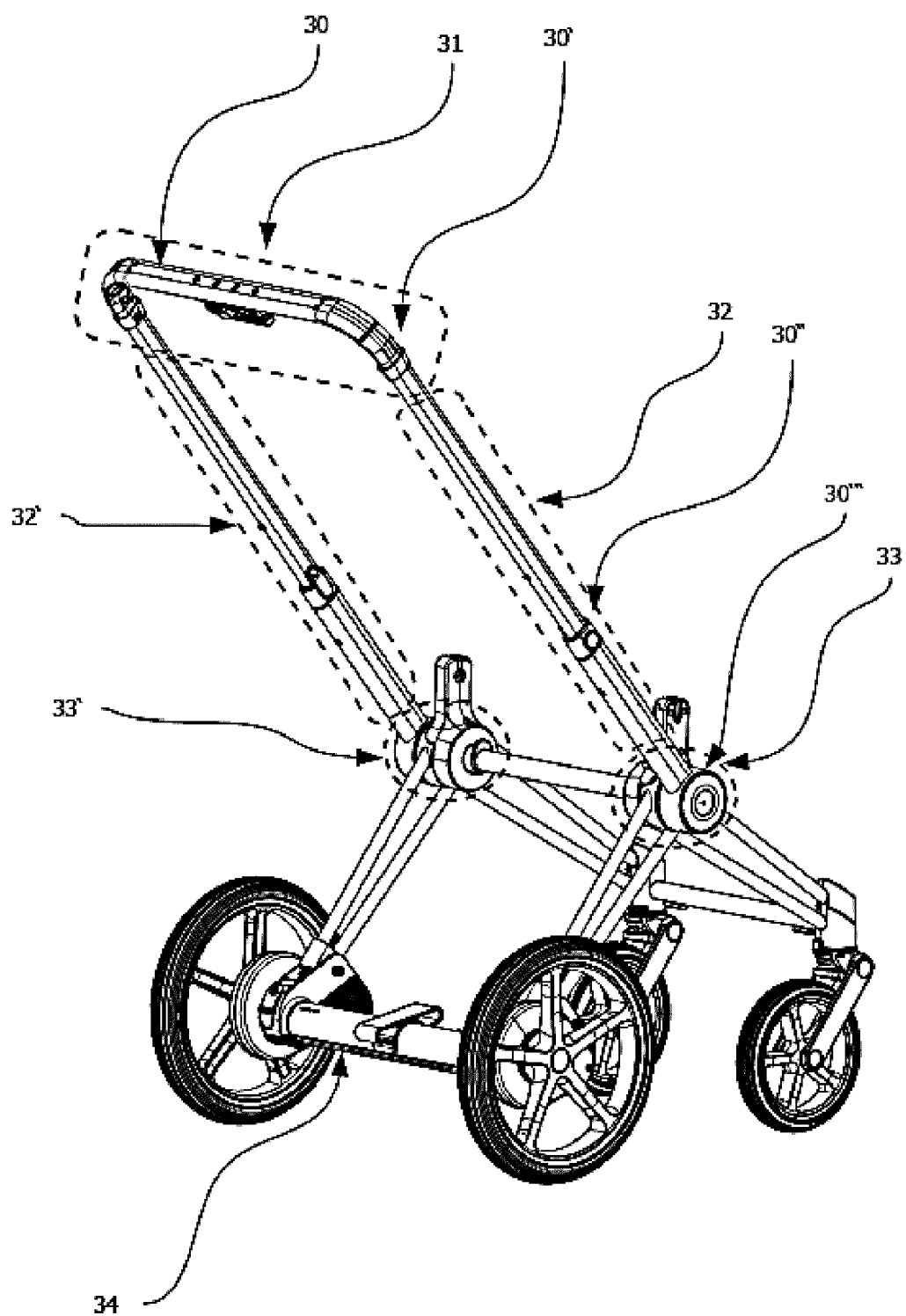
Figure 3:
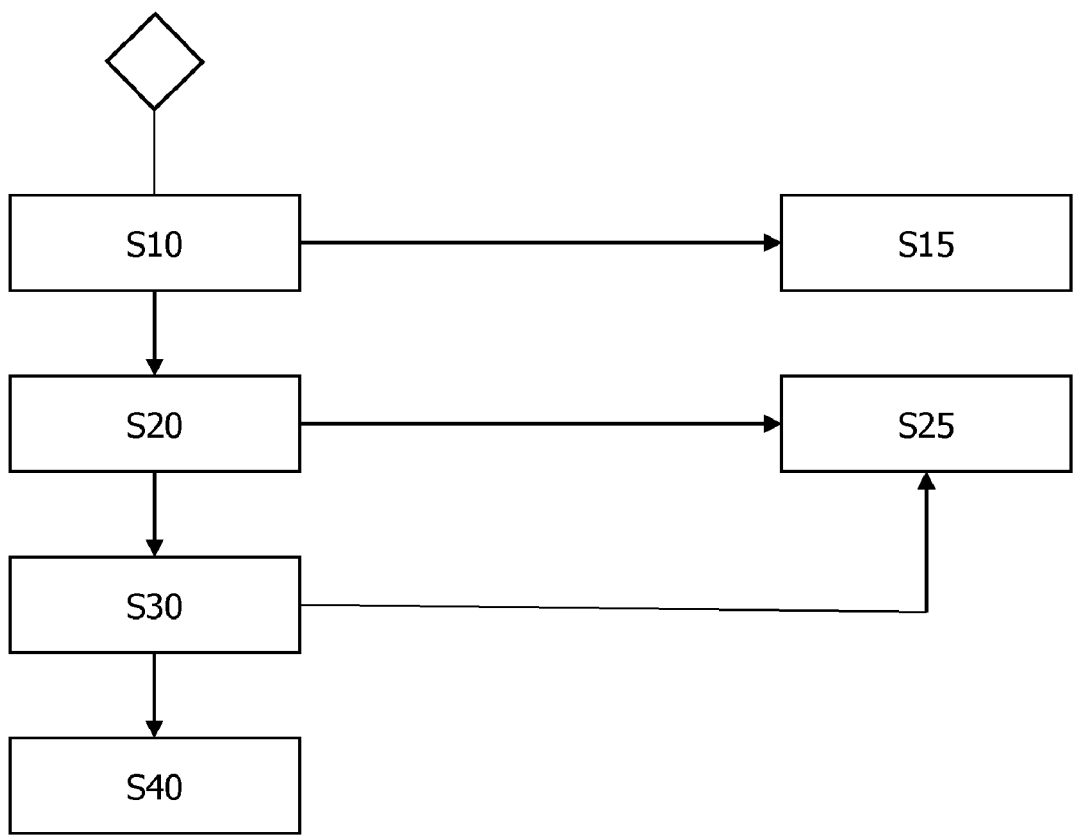

In the following, the invention will be described by means of executive examples which are explained in more detail with reference to the figures. Hereby Show:

FIG. 1 a schematic representation of a stroller in oblique view;

FIG. 2 a schematic representation of the stroller frame according to FIG. 1, highlighting different arrangement possibilities of force sensor devices;

FIG. 3 a flow chart illustrating a procedure of initiating and performing a calibration.

In the following, the same reference numerals are used for same parts as well as parts having the same effect.

FIG. 1 shows a stroller 1 having four wheels 2. Two front wheels 2 are each connected to the stroller 1 via wheel mounts 3 with a front wheel suspension 18. In the front area of the stroller 1, a front wheel strut 19 is arranged between the wheel attachments 3 to stabilize the wheels 2 on the stroller 1. By means of a pusher 4, the stroller 1 can be pushed (or pulled). A child receiving device 5 (e.g. seat and/or lying attachment, such as in particular a seat shell, a seat unit or a reclining tub), in which a child can be received, is shown schematically only.

The wheel mounts 3 of the front wheels 2 are connected to an adjusting device 15 via a front wheel suspension 18. The adjusting device 15 is arranged offset to the rear above the front wheels 2. A rear wheel suspension 17, on which two rear wheels are arranged on a rear wheel axle 24, is also arranged on the adjusting device 15. A parking brake 20 is arranged at least approximately centrally on the rear wheel axle and is designed to be actuated by a foot. The parking brake 20 is designed to lock the rear wheels. These can then only be set in motion again by releasing the parking brake 20.

At the ends of the rear wheel axle 24, in the execution example shown, two electric motors 21 for driving the rear wheels are arranged. However, in further execution examples, it is also conceivable that a single motor drives both wheels via a shaft and/or a gearbox.

In the shown execution example of FIG. 1, the rear wheel axle 24 is designed as a hollow cylinder, wherein an accumulator 23, which is electrically connected to the electric motors 21, is arranged in the rear wheel axle 24. Alternatively, the rear wheel axle 24 can also be designed as a strut and the accumulator 23, possibly partially, underneath. Furthermore, control electronics can be arranged in or on the rear wheel axle 24, which are designed to control the functions of the motors 21.

Further retaining devices 25, which are designed to receive the child receiving device 5, are arranged on the adjusting device 15.

The adjusting devices 15 are connected to one another via a cross strut 16 in order to ensure the stability of the overall device. In addition, pusher receiving devices 26 extending obliquely upwards and rearwards, which are connected to a pusher device via connecting elements 14, are arranged on the adjusting devices 15. The pusher device consists of two side struts 13, 13' which are arranged displaceably in the pusher receiving device 26. The side struts 13, 13' can be fixed via the connecting elements 14. At the end of the side struts 13, 13' a (horizontal) pusher section 12 is arranged, which a user can grip to push the stroller 1.

FIG. 2 shows different ways of arranging force sensor devices 30, 30', 30", 30'" on the stroller 1. For example, FIG. 2 shows a first sensor area 31, which in the execution example shown comprises the pusher section of the stroller 1. In the first sensor area 31 force sensors 30, 30' may be arranged. The force sensor 30 may be a sensor that is configured to measure a force. The force sensor 30 therefore emits a signal that can be translated into a force.

In the execution example shown, the force sensor 30 is arranged in the pusher section of the stroller 1 in the first sensor area 31 such that an interaction with a user of the stroller 1 can be detected. In this regard, in one execution example, the force sensor 30 is recessed in the pusher section 12, wherein a contact surface of the force sensor 30 is oriented in a direction pointing toward the user of the stroller 1.

In addition to attaching a force sensor device 30 in the pusher section, it is also possible, in a further execution example, to arrange force sensors 30' in a second sensor area 32 in a connecting area of the pusher section 12 with side struts 13, 13' of the stroller 1. In this case, the pusher section 12 can be arranged displaceably in the side struts 13, 13' and fixed via a fastening element or connecting element 14'. A force sensor device, for example a force sensor 30', can be arranged in the connecting element 14' for measuring forces applied to the pusher section 12 by a user. A force sensor 30, 30' may also be formed elongated, thereby covering an area of both the pusher section 12 as well as the connecting section.

FIG. 2 also shows, superimposed, a second execution example in which a force sensor device 30" is arranged in a connecting element of the side struts 13, 13'.

In a further execution example, a force sensor device 30'" is arranged in a third sensor area 33 or 33' on the adjusting device 15. Preferably, this is a torque sensor 30'". The torque sensor 30'" is designed to measure a torque which is caused by a force exerted by the user on the pusher section 12 or the side struts 13, 13'.

A control unit 34 is arranged in the rear wheel axle 24, which is communicatively connected to the force sensor devices 30, 30', 30", 30'". The control unit 34 is designed to receive and process sensor data generated by the force sensor devices 30, 30', 30" and/or 30'".

FIG. 3 shows a flow diagram for initiating and performing a calibration of the force sensor device.

After the motor has been switched on (by the user), the control unit first checks in a step S10 whether a force whose value is greater than a limit value, for example 10 N to 100 N, preferably 20 N to 50 N, further preferably (at least approximately) 30 N, is acting on the force sensor device. If this is the case, an error message is output in a step S15. In this case, no calibration is performed and, if applicable, no motor assistance is provided.

If the amount of the force is less than the limit value, then in a step S20 it is checked whether at least one wheel of the stroller 1 or stroller frame 10 is turning. If this is the case, a preliminary operation of the stroller is performed with the last stored calibration value (step S25). If the at least one wheel does not turn, in the next step S30 the control unit checks whether all values of a plurality of, for example, 3 to 10, preferably 5 to 20, particularly preferably 10 last measured values (alternatively or additionally a plurality of last measured values, which, rounded to the nearest integer, corresponds to 0.3 to 10 times the amount of the frequency measured in hertz, further preferably to 0.5 to 2 times the frequency measured in hertz) lie in a predetermined interval (i.e. an interval of predetermined width or size), and/or whether a statistical parameter of the measured plurality of values, for example the variance or other statistical spread, does not exceed a predetermined value.

A value (width) of the interval is preferably between 0.1 N to 5 N, further preferably at least 0.3 N to 2 N, particularly preferably (at least approximately) at 0.6 N. If this applies, a calibration is carried out in step S40. In particular, a mean value of last measured values can be formed and used as a (new) zero point, whereby the mean value can preferably be an arithmetic mean or a geometric mean or a harmonic mean or a weighted or trimmed mean or another suitable mean value. If this is not the case, preliminary operation of the stroller is performed using the last stored calibration value.

To conserve memory resources, the motor can then be operated with this value until it is switched off. However, a calibration can also be provided at predetermined intervals (e.g., at intervals of 5 min to 15 min, preferably 10 min to 2 h) and/or when predefined conditions occur (for example, when the temperature has changed by at least 3° C. or at least 6° C. or at least 10° C. compared to the last calibration).

The next time the motor is switched on, the (entire) cycle can possibly be repeated.

At this point it should be noted that all the parts described above, considered alone and in any combination, in particular the details shown in the drawings, are claimed as further embodiments of the invention. Modifications are possible.

LIST OF REFERENCE SIGNS

S10 step
S15 step
S20 step
S25 step
S30 step
S40 step
1 stroller
2 wheel
3 wheel attachment
4 pusher
5 child receiving device
10 stroller frame
11 frame
12 pusher section
13, 13' side struts
14, 14' connecting element
15 adjusting device
16 cross strut
17 rear suspension
18 front wheel suspension
19 front wheel strut
20 parking brake
21 motor
22 braking device
23 accumulator
24 rear wheel axle
25 retaining devices
26 pusher receiving devices
31 first sensor area
32, 32' second sensor area
33, 33' third sensor area
34 control unit
30, 30', 30" force sensor
30'" torque sensor

The invention claimed is:

1. A stroller or a stroller frame, comprising:
a motor, for assisted driving the stroller or the stroller frame;

at least one pusher for pushing the stroller or the stroller frame;

a force sensor device for detecting a force-related variable, in particular a force or a force component which acts on the at least one pusher, or a variable derived from this force or force component; and a control unit configured to initiate a calibration of the force sensor device depending on a result of a plurality of detections of the force-related variable when the plurality of detections of the force-related variable are within a value interval of a predetermined width of at least 0.1 N for the force-related variable or if a statistical spread of the plurality of detections is at or below a predetermined value of at least 0.1 N.

2. The stroller or the stroller frame according to claim 1, wherein
the control unit is configured to initiate the calibration of the force sensor device when the result indicates that there is no pushing by a person.

3. The stroller or the stroller frame according to claim 1, wherein
the control unit is configured to initiate the calibration of the force sensor device when a predetermined rotational speed of at least one wheel, is undershot as indicative that the at least one wheel is at rest.

4. The stroller or the stroller frame according to claim 1, wherein
the control unit is configured to initiate the calibration of the force sensor device when a detected value of the force-related variable is at or below a predetermined value of at least 1 N.

5. The stroller or the stroller frame according to claim 1, wherein
the control unit is configured to inhibit or stop motor assistance, or to cause an error indication when a detected value of the force-related variable is at or above a predetermined value of at least 10 N.

6. The stroller or the stroller frame according to claim 1, wherein
the force sensor device or the control unit is configured to perform a detection of the force-related variable, at least until an initiation of the calibration, in a predetermined frequency of at least 2 Hz.

7. The stroller or the stroller frame according to claim 1, wherein
the plurality of detections is at least 5, or
the plurality of detections is at least 0.3 times as large as a frequency of detection of the force-related variable in Hz.

8. The stroller or the stroller frame according to claim 1, wherein
the control unit is designed to perform the calibration to determine a new reference point, in particular zero point, for the force-related variable, depending on one or more values of the force-related variable taken into account for an initiation, wherein a mean value of a plurality of values of the force-related variable taken into account for the initiation is defined as the new reference point.

9. The stroller or the stroller frame according to claim 1, wherein
the control unit is designed to control the motor based on a stored calibration until a new calibration is performed.

10. The stroller or the stroller frame according to claim 1, wherein
the control unit is designed to check, in particular after start-up of the motor and possibly subsequent initial calibration, at predetermined intervals of at least 5 minutes, whether an initiation of the calibration is possible, and also initiates such calibration, or
the control unit is designed, once the calibration has been initiated, not to initiate any further calibration until the motor is switched off.

11. The stroller or the stroller frame according to claim 1, wherein
the control unit is designed to check, in particular after start-up of the motor and possibly subsequent initial calibration, whether an initiation of the calibration is possible if a predetermined condition, in particular one predetermined externally, for a change in temperature compared with a temperature at a time of a last calibration, is present, and also initiates the calibration dependent upon the predetermined condition.

12. A computer-readable storage medium containing instructions which cause at least one processor to implement a method for controlling a stroller or stroller frame according to claim 1, comprising at least one motor for assisted driving the stroller or stroller frame, and at least one pusher for pushing the stroller or stroller frame, when the instructions are executed by a processor, wherein in the method the method includes sensing with a force sensor device a force-related variable, in particular a force or a force component acting on a pusher or a variable derived from this force or force component acting on the pusher where the variable is a torque or a change over time of the force or force component, wherein a calibration of the force sensor device is initiated depending on a result of a plurality of detections of the force-related variable when the plurality of detections of the force-related variable are within a value interval of a predetermined width of at least 0.1 N for the force-related variable or if a statistical spread of the plurality of detections is at or below a predetermined value of at least 0.1 N.

13. The computer-readable storage medium containing instructions according to claim 12, wherein the statistical spread is a variance.

14. The stroller or the stroller frame according to claim 1, wherein the statistical spread is a variance.

15. A method for controlling a stroller or stroller frame, comprising:
providing at least one motor for assisted driving the stroller or stroller frame, pusher for pushing the stroller or stroller frame;
providing a force sensor device for detecting a force-related variable, in particular a force or a force component which acts on the pusher, or a variable derived from this force or force component;
providing at least one control unit; and
initiating a calibration of the force sensor device depending on a result of a plurality of detections of the force-related variable when the plurality of detections of the force-related variable are within a value interval of a predetermined width of at least 0.1 N for the force-related variable or if a statistical spread of the plurality of detections is at or below a predetermined value of at least 0.1 N.

16. The method according to claim 15, wherein the statistical spread is a variance.

* * * * *